(12) United States Patent
Akutsu

(10) Patent No.: US 11,135,901 B2
(45) Date of Patent: Oct. 5, 2021

(54) AIR VENT STRUCTURE

(71) Applicant: CALSONIC KANSEI CORPORATION, Saitama (JP)

(72) Inventor: Takayuki Akutsu, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 206 days.

(21) Appl. No.: 16/078,600

(22) PCT Filed: Feb. 23, 2017

(86) PCT No.: PCT/JP2017/006698
§ 371 (c)(1),
(2) Date: Aug. 21, 2018

(87) PCT Pub. No.: WO2017/146125
PCT Pub. Date: Aug. 31, 2017

(65) Prior Publication Data
US 2019/0030996 A1     Jan. 31, 2019

(30) Foreign Application Priority Data

Feb. 24, 2016   (JP) .............................. JP2016-033483

(51) Int. Cl.
*B60H 1/34* (2006.01)
*F24F 13/24* (2006.01)
*F24F 13/15* (2006.01)
*B60H 1/00* (2006.01)

(52) U.S. Cl.
CPC ....... *B60H 1/3421* (2013.01); *B60H 1/00507* (2013.01); *B60H 1/3442* (2013.01); *F24F 13/15* (2013.01); *F24F 13/24* (2013.01); *B60H 2001/006* (2013.01); *F24F 2013/247* (2013.01)

(58) Field of Classification Search
CPC combination set(s) only.
See application file for complete search history.

(56) References Cited

U.S. PATENT DOCUMENTS

| 2007/0066206 A1* | 3/2007 | Ono .................... B60H 1/3428 |
| | | 454/69 |
| 2015/0183300 A1 | 7/2015 | Kwon et al. |
| 2015/0202946 A1* | 7/2015 | Inagaki ................ B60H 1/3442 |
| | | 454/154 |

FOREIGN PATENT DOCUMENTS

| CN | 104742686 A | 7/2015 |
| JP | 58-8044 U | 1/1983 |
| JP | 2-123416 U | 10/1990 |
| JP | 2004-51064 A | 2/2004 |
| JP | 2007-55427 A | 3/2007 |

(Continued)

OTHER PUBLICATIONS

JP2004051064MT; Machine Translation of JP2004051064A From Espacenet (Year: 2004).*

*Primary Examiner* — Steven B McAllister
*Assistant Examiner* — Elizabeth M. May
(74) *Attorney, Agent, or Firm* — Knobbe, Martens, Olson & Bear, LLP

(57) ABSTRACT

The present disclosure relates to an air vent structure. The air vent structure at least includes a tubular housing through which an air-conditioned air flows, and an annular finisher in an air flow-out end of the housing. The air vent structure further includes an air restrictor that restricts the inflow of the air-conditioned air into a clearance between the air flow-out end of the housing and the finisher.

7 Claims, 11 Drawing Sheets

(56) References Cited

FOREIGN PATENT DOCUMENTS

| | | |
|---|---|---|
| JP | 3154927 U | 10/2009 |
| JP | 2010-12919 A | 1/2010 |
| JP | 2012-161962 A | 8/2012 |
| WO | WO 2015/140808 A1 | 9/2015 |

* cited by examiner

AIR VENT STRUCTURE

CROSS-REFERENCE TO RELATED APPLICATION

This application is based upon and claims the benefit of priority from Japanese Patent Application No. 2016-033483 filed to the Japan Patent Office on Feb. 24, 2016, the entire disclosure of which is incorporated herein by reference.

TECHNICAL FIELD

The present disclosure relates to an air vent structure.

BACKGROUND ART

A vehicle such as an automobile includes an instrument panel in a front portion of a vehicle cabin. The instrument panel includes an air vent portion such as a ventilation grill for supplying an air-conditioned air to the vehicle cabin (see Patent Literature 1: JP 2010-12919A, for example).

The air vent portion at least includes a tubular housing through which the air-conditioned air flows, and an annular finisher in an air flow-out end of the housing

SUMMARY

However, the air vent structure of Patent Literature 1 may generate (high-frequency) wind noise.

Accordingly, a main object of the present disclosure is to solve the above issue.

To overcome the above issue, the present disclosure at least includes a tubular housing through which an air-conditioned air flows, and an annular finisher in an air flow-out end of the housing. The present disclosure further includes an air restrictor that restricts the inflow of the air-conditioned air into a clearance between the air flow-out end of the housing and the finisher.

DETAILED DESCRIPTION

Hereinafter, embodiments of the present disclosure will be described in detail with reference to the accompanying drawings.

FIGS. 1 to 18 are drawings for illustrating the embodiments.

First Embodiment

Hereinafter, the configuration of the First Embodiment will be described.

A vehicle such as an automobile includes an instrument panel in a front portion of a vehicle cabin. The instrument panel includes an air vent portion such as a ventilation grill for supplying an air-conditioned air to a vehicle cabin.

Figure 1:
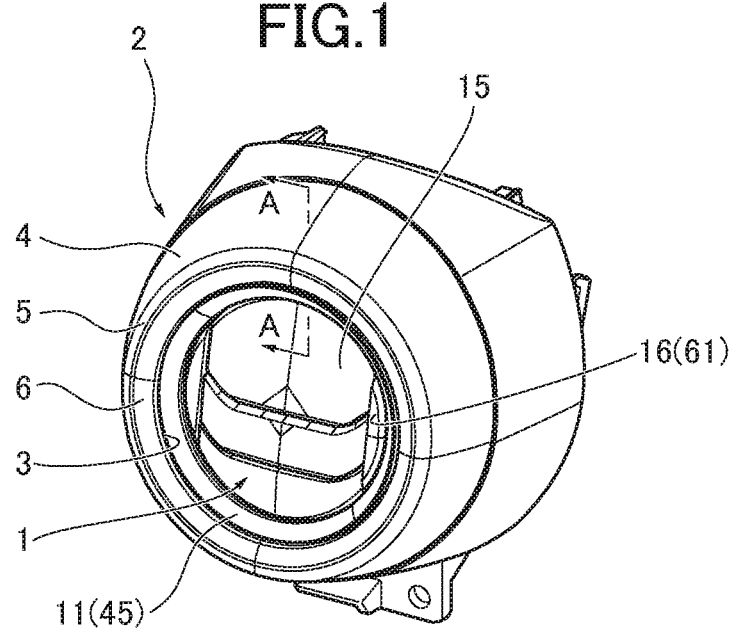
FIG. 1 is a perspective view illustrating an entire air vent structure according to the First Embodiment.
Figure 2:
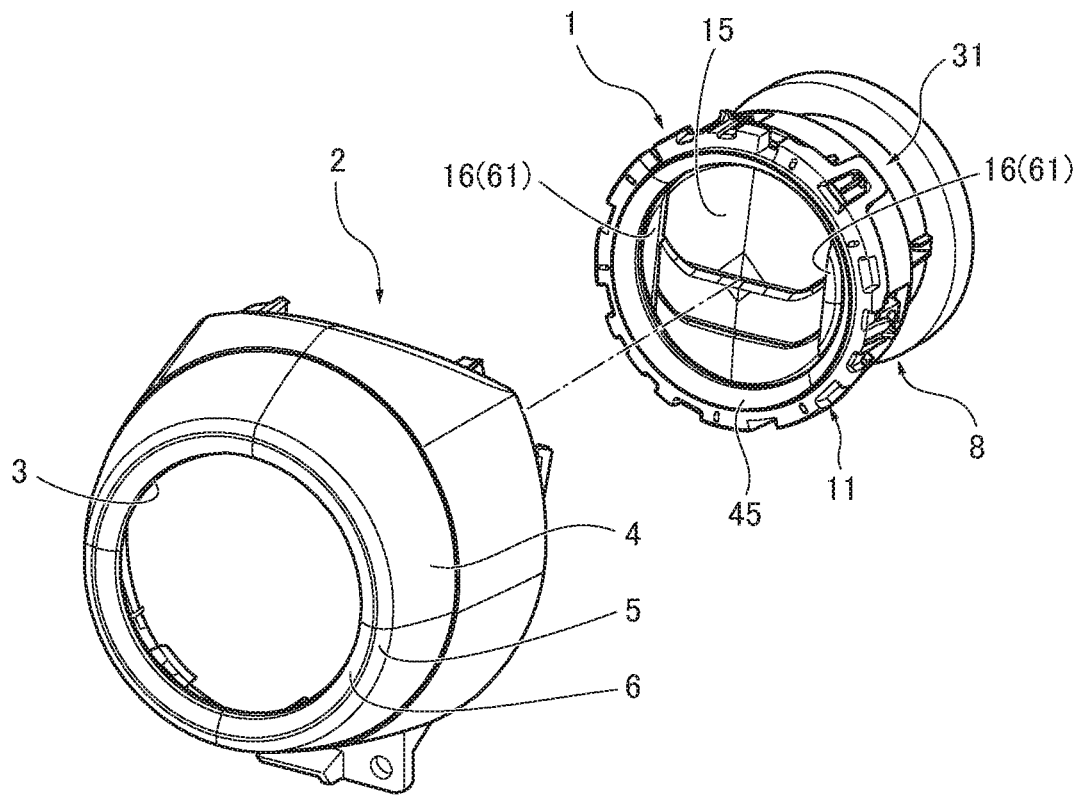
FIG. 2 is an exploded perspective view illustrating the air vent structure shown in FIG. 1.

As shown in FIGS. 1, 2, an air vent portion 1 constitutes an air vent structure by being covered with a cover 2 after being attached to the instrument panel.

The cover 2 includes at least an opening 3 for an air-conditioned air from the air vent portion 1. The cover 2 is attached to the instrument panel to cover the air vent portion 1.

In this embodiment, the cover 2 is a decorative member having a three-dimensional shape including the opening 3. The cover 2 includes a reduced diameter portion 4 and an enlarged diameter portion 6. The reduced diameter portion 4 has a diameter which gradually reduces or contracts toward the opening 3 (toward a vehicle rear side or a vehicle cabin side) to substantially form a mountain shape. The enlarged diameter portion 6 gradually enlarges or expands toward a tip 5 of the reduced diameter portion 4 (toward the vehicle rear side or the vehicle cabin side) to define the opening 3.

Figure 3:
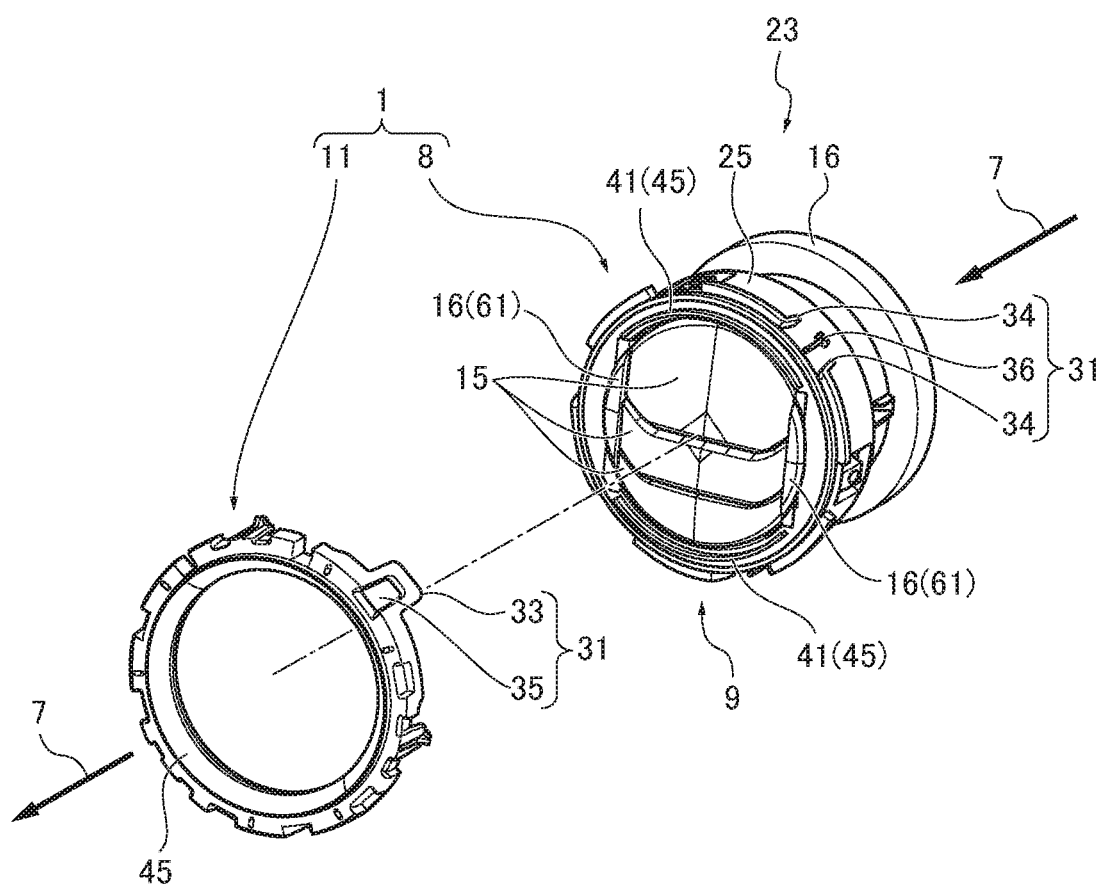
FIG. 3 is an exploded perspective view illustrating the air vent structure without a finisher.

As shown in FIG. 3, the air vent portion 1 at least includes a tubular housing 8 through which an air-conditioned air 7 flows, and an annular finisher 11 in an end 9 (air flow-out end) of the housing 8.

Figure 4:
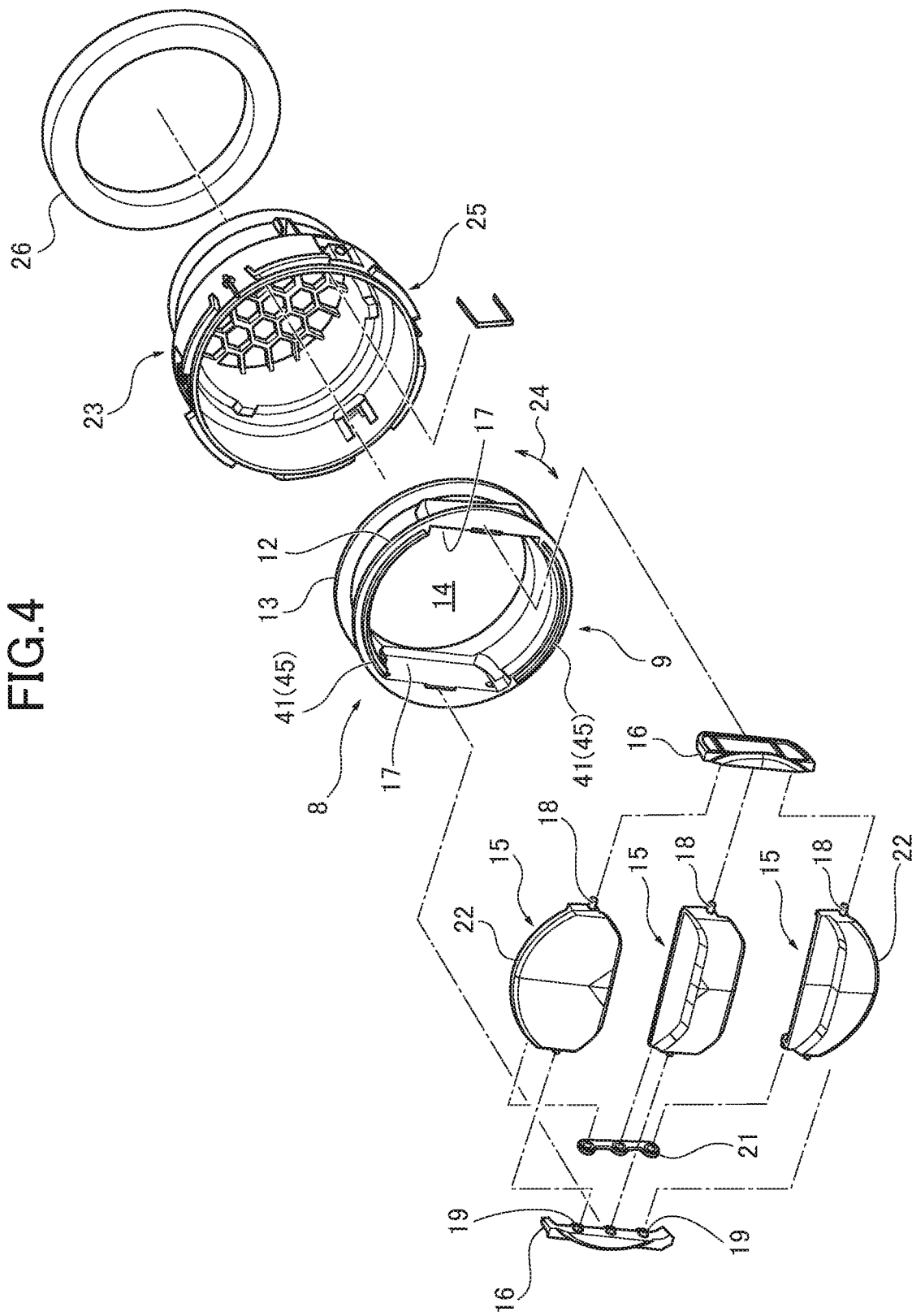
FIG. 4 is an exploded perspective view illustrating remaining members (housing-side members) of the air vent structure shown in FIG. 1 other than the finisher.

As shown in FIG. 4, the housing 8 has a substantially circular cylinder shape (is a short cylinder member). The housing 8 includes flanges 12, 13 at both ends respectively and an air passage 14 therewithin. The housing 8 is a louver housing which accommodates a plurality of the louver slats or boards 15. Each of the louver slats 15 is held by a pair of left and right holders 16 at both ends. The louver slats 15 are inserted inside of the housing 8 from the air flow-out end 9 (the flange 12 side) of the housing 8 while held by the holders 16, and are attached to the housing 8. The housing 8 includes flat installation surfaces 17 (mounting seats for the holders) for the left and right holders 16. The installation surfaces 17 extend parallel to each other.

Each of the louver slats 15 includes a rotational center shaft 18 at each end. Each of the holders 16 includes a plurality of shaft holes 19 each of which rotatably supports the rotational center shaft 18 of the louver slats 15. A link 21 is provided at least between one of the holders 16 and the louver slats 15 to link and incline the louver slats 15. The link 21 rotatably supports connecting shafts (not shown) provided in each of the louver slats 15. According to the above configuration, the louver slats 15 rotate about the rotational center shafts 18 to open or close the air passage 14 of the housing 8 and/or the opening 3 of the cover 2 and to adjust the opening degree of the air passage 14 and/or the opening 3. In addition, the flow direction of the air 7 (wind direction) (or directions of side edges 22 of the louver slats 15) can be adjusted about the rotational center shafts 18 by changing angles of the louver slats 15.

The housing 8 is accommodated within a tubular grill body 23 so as to rotate in a circumferential direction 24. The housing 8 (i.e. the rotating member) is inserted inside of the tubular grill body 23 (i.e. the fixed member) from the air flow-out end side and is attached to the tubular grill body 23. The grill body 23 includes a housing receiving portion 25 at an air flow-out end side thereof. The housing receiving portion 25 has larger diameter and roratably accommodates the housing 8. The grill body 23 includes a sealing member 26 (relative to an air conditioning duct) at an air flow-in end of the housing 8 to surround the air flow-in end.

As shown in FIG. 3, the finisher 11 is configured to function as a retainer for the holders 16 which retains or holds the holders 16 to prevent the louver slats 15 within the housing 8 from falling off from the air flow-out end 9 of the housing 8. In addition, the finisher 11 is also configured to function as a retainer for the housing 8 which retains or holds the housing 8 to prevent the housing 8 within (the housing receiving portion 25 of) the grill body 23 from falling off from the air flow-out end of the grill body 23. Note that the directions of the louver slats 15 (the flow direction of the air 7) can be changed in the circumferential direction 24 by rotating the housing 8 in the circumferential direction 24 relative to the grill body 23.

The outer circumferential portion of the finisher 11 and the outer circumferential surface of the grill body 23 include a nail fixture 31 to engage and fix the finisher 11 and the grill body 23 relative to each other. The nail fixture 31 includes a plurality of tongue portions 33 provided on the outer circumferential portion of the finisher 11, and a plurality of receiving portions 34 provided on the outer circumferential surface of the grill body 23. The tongue portions 33 are arranged in the circumferential direction 24 and extend from the edge of the finisher 11 along the outer circumferential surface of the grill body 23. The receiving portions 34 are configured to engage with the tongue portions 33 and hold or clamp the tongue portions 33. Each of the tongue portions 33 includes a nail opening 35 and each of the receiving portions 34 includes a nail portion 36.

Figure 5:
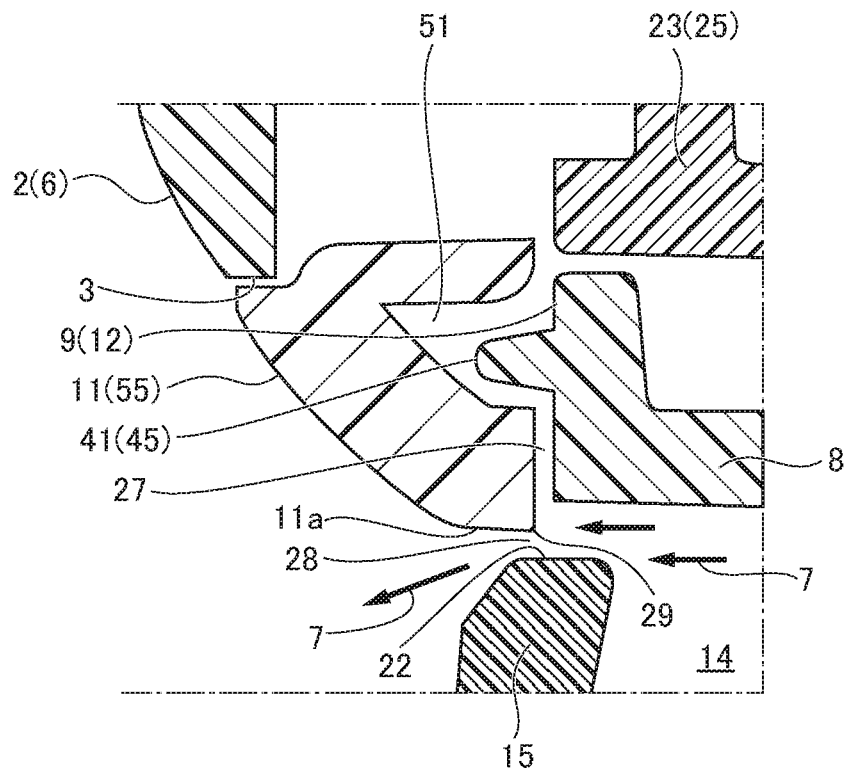
FIG. 5 is a partially enlarged cross sectional view along a line A-A shown in FIG. 1.

As shown in FIG. 5, a relatively small gap or clearance 27 is formed between the air flow-out end 9 of the housing 8 and the finisher 11. The clearance 27 prevents the housing 8 and the finisher 11 from contacting each other so that the operation force when rotating the housing 8 relative to the grill body 23 does not become excessive, or the operation feeling when rotating the housing 8 is not deteriorated. Preferably, the size of (at least an inlet of) the clearance 27 is the substantially same as the size of a gap or clearance 28 between the side edge 22 of the louver slats 15 and an opening 11a of the finisher 11, or smaller than the size of the clearance 28.

Figure 6:
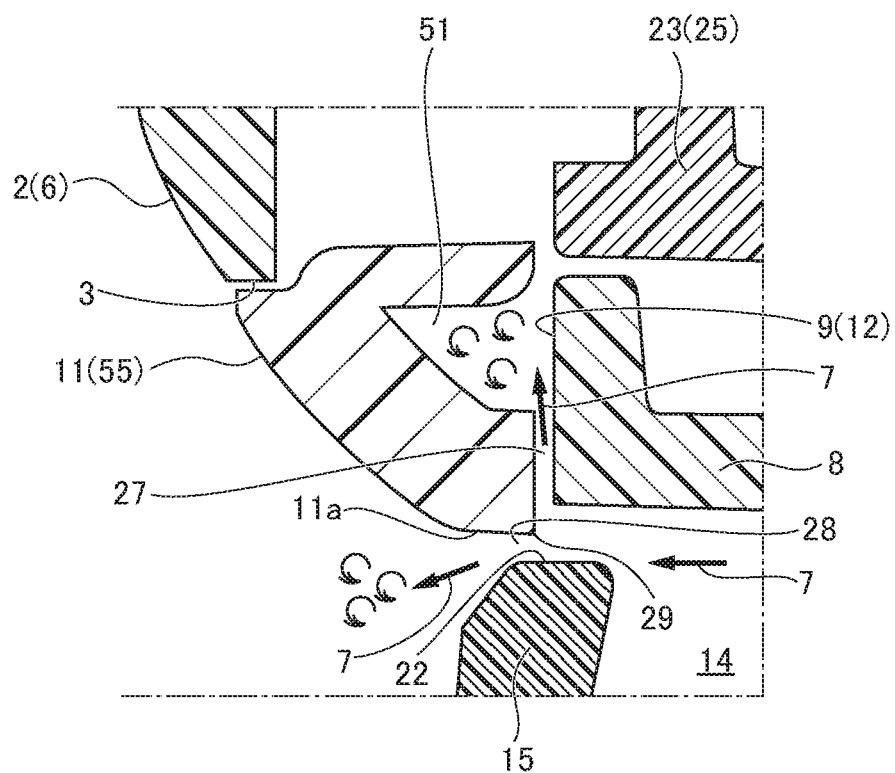
FIG. 6 is a partially enlarged cross sectional view, which is similar to FIG. 5, illustrating without an air restrictor.

It is necessary for the opening 11a of the finisher 11 to have a diameter smaller than that of the inner circumferential surface of the housing 8 so that the housing 8 cannot be seen from outside. Accordingly, as shown in FIG. 6, a reverse-stepwise protruding portion 29 is formed to extend between the opening 11a of the finisher 11 and the inner circumferential surface of the housing 8. The protruding portion 29 inhibits the outflow of the air 7 from the opening 3 and directs the air 7 to the clearance 27.

In addition to the above basic configuration, the embodiment includes following elements.

(1) As shown in FIG. 5, air restrictors 41 is provided to restrict the inflow of the air-conditioned air 7 to the clearance 27 between the air flow-out end 9 of the housing 8 and the finisher 11.

The air restrictors 41 may have any configuration shown in following embodiments. However, it is preferable to have a following configuration.

(2) The air restrictors 41 are ribs 45 for restricting the inflow of the air (air restricting ribs) which extend from the air flow-out end 9 of the housing 8 to the finisher 11.

The air restricting ribs 45 are integrally formed in the housing 8 to extend therefrom so as to restrict the inflow of the air 7 deep into a farther portion of the clearance 27. In this embodiment, each of the air restricting ribs 45 has a round tip. The side surfaces of the rib 45 are inclined to form a tapered cross-sectional shape for demolding. However, the cross-sectional shape of the rib 45 is not limited to the above.

(3) The finisher 11 includes a space 51 in a portion facing the housing 8. The air restricting ribs 45 extend into the space 51.

The inner circumferential portion of the finisher 11 functions as a decorative surface 55 which can be seen from the outside (the vehicle cabin) through the opening 3 since the inner circumferential portion is located inside of the opening 3 of the cover 2 so as to be exposed to the outside. In terms of the design, the decorative surface 55 includes an inclined surface or the like which seems to naturally continue with the enlarged diameter portion 6 which defines the opening 3 of the cover 2.

The outer circumferential portion of the finisher 11 outward from the decorative surface 55 is covered by the cover 2. The decorative surface 55 having the inclined surface, and the outer circumferential portion are formed to have a substantially L- or C-shaped cross section so that the space 51 is defined in the side (back side) of the finisher 11 facing the housing 8. The space 51 is in communication with the clearance 27, or partially expands the center portion or the farther portion of the clearance 27.

Each of the air restricting ribs 45 is inserted into the space 51 at the center portion or the farther portion of the clearance 27. Accordingly, an extending amount of the air restricting rib 45 is larger (longer) than the inlet portion of the clearance 27 to the extent that the rib 45 does not touch the finisher 11.

Figure 7:
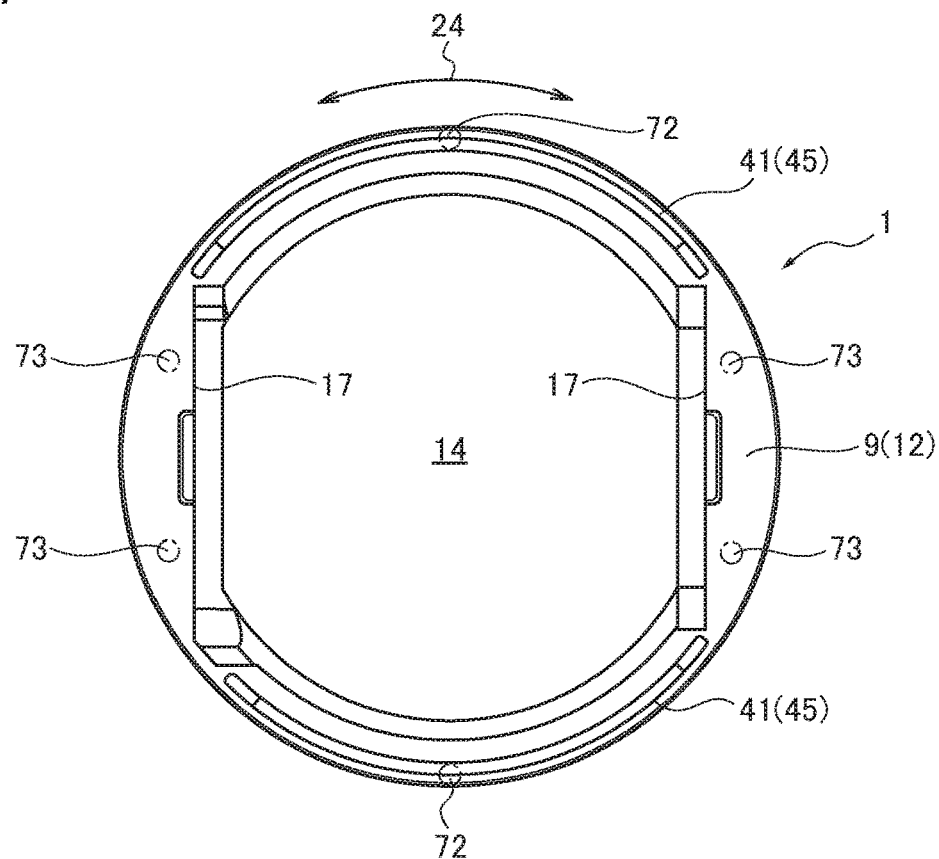
FIG. 7 is a view illustrating an air flow-out end of the housing, which is shown in FIG. 4, as seen from a vehicle cabin side.
Figure 8:
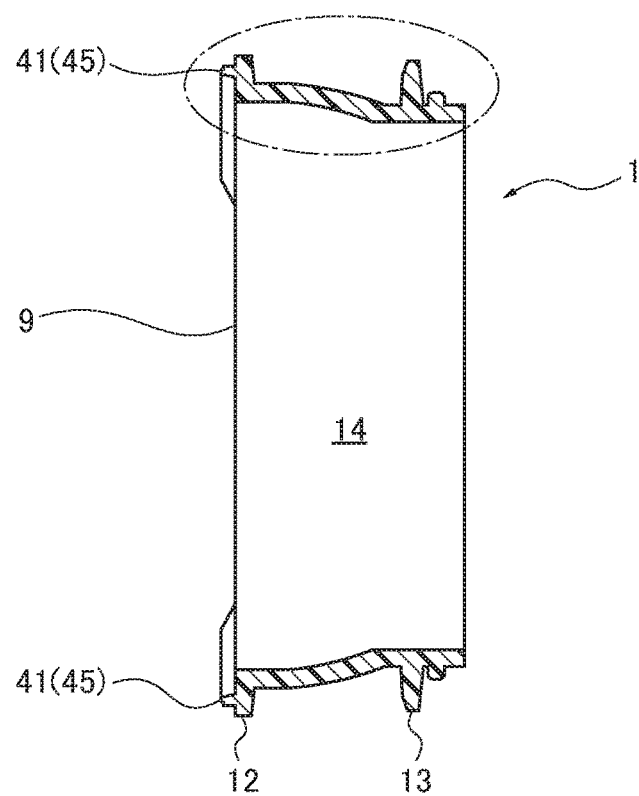
FIG. 8 is a vertical cross sectional view of the housing, which is shown in FIG. 7, as seen from the side of the housing.

(4) As shown in FIG. 7 (FIG. 8), the air restricting ribs 45 may (partially) extend along at least a part of the air flow-out end 9 of the housing 8 in the circumferential direction 24.

As shown in FIGS. 1, 2, each holder 16 which holds the louver slats 15 includes a protrusion 61 provided on a surface (vehicle cabin side surface) facing the vehicle cabin. The protrusion 61 extends from the housing 8 toward the vehicle cabin side (the vehicle rear side) of the finisher 11 through the finisher 11. The clearance 27 is covered by the protrusions 61 in positions where the protrusions 61 are provided. Accordingly, it is not necessary to provide the air restricting ribs 45 in the positions where the protrusions 61 of the holders 16 are located but it is sufficient to locally provide the air restricting ribs 45 along the side edges 22 of the louver slats 15 where the protrusions 61 of the holders 16 are not located. The tip portion of the protrusion 61 is a part of the decorative surface of the air vent portion 1. The tip portion has an elongated shape in a front view and is formed by a circular arc and a straight line connecting the both end of the arc.

It should be noted that the air restricting rib 45 may be provided to extend in the entire circumference of the air flow-out end 9 of the housing 8 in the case where there is no element partially covering the clearance 27 such as the protrusions 61 of the holders 16.

Figure 9:
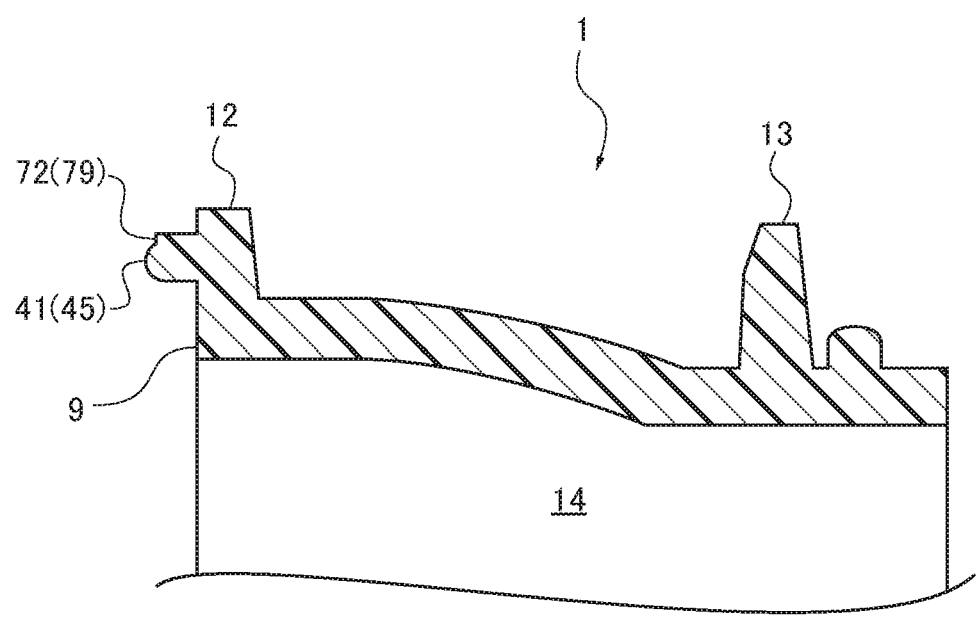
FIG. 9 is a partially enlarged cross sectional view of FIG. 8.

(5) As shown in FIG. 9 (to FIG. 11), each of the air restricting ribs 45 includes a receiving surface 72 around the tip thereof. The receiving surface 72 receives an external ejector pin 71 (see FIG. 10).

Figure 10:
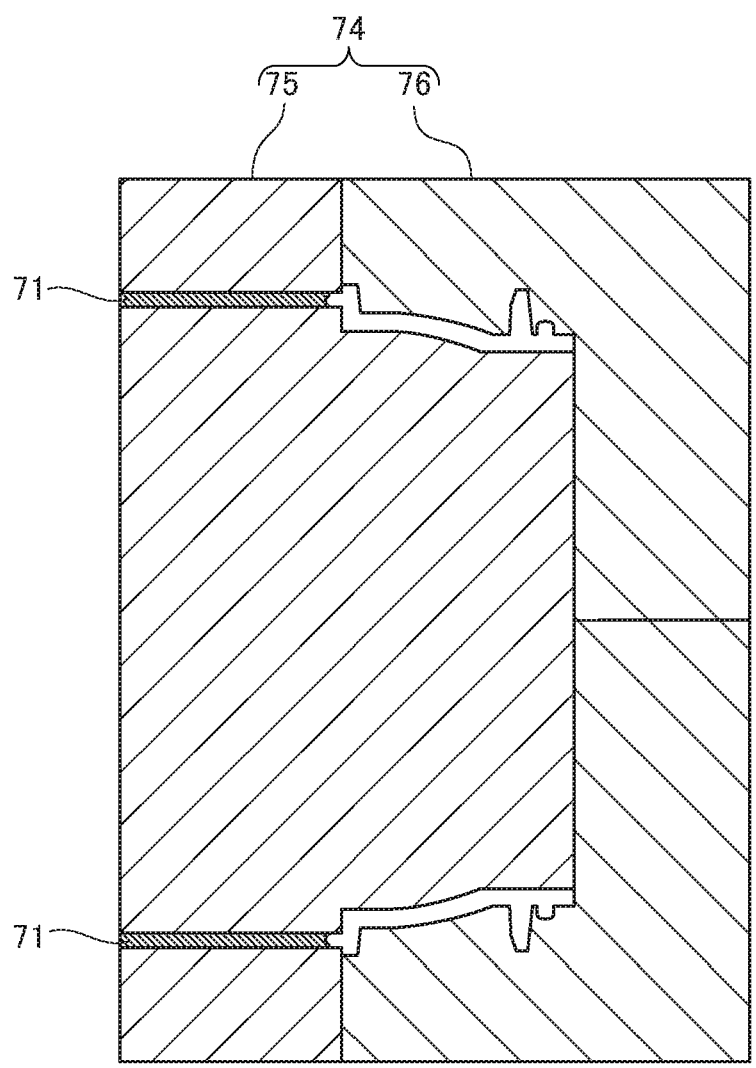
FIG. 10 is an explanatory view of a mold device for injection-molding the housing (a vertical cross sectional view of the mold device in a closed position before the injection molding).
Figure 11:
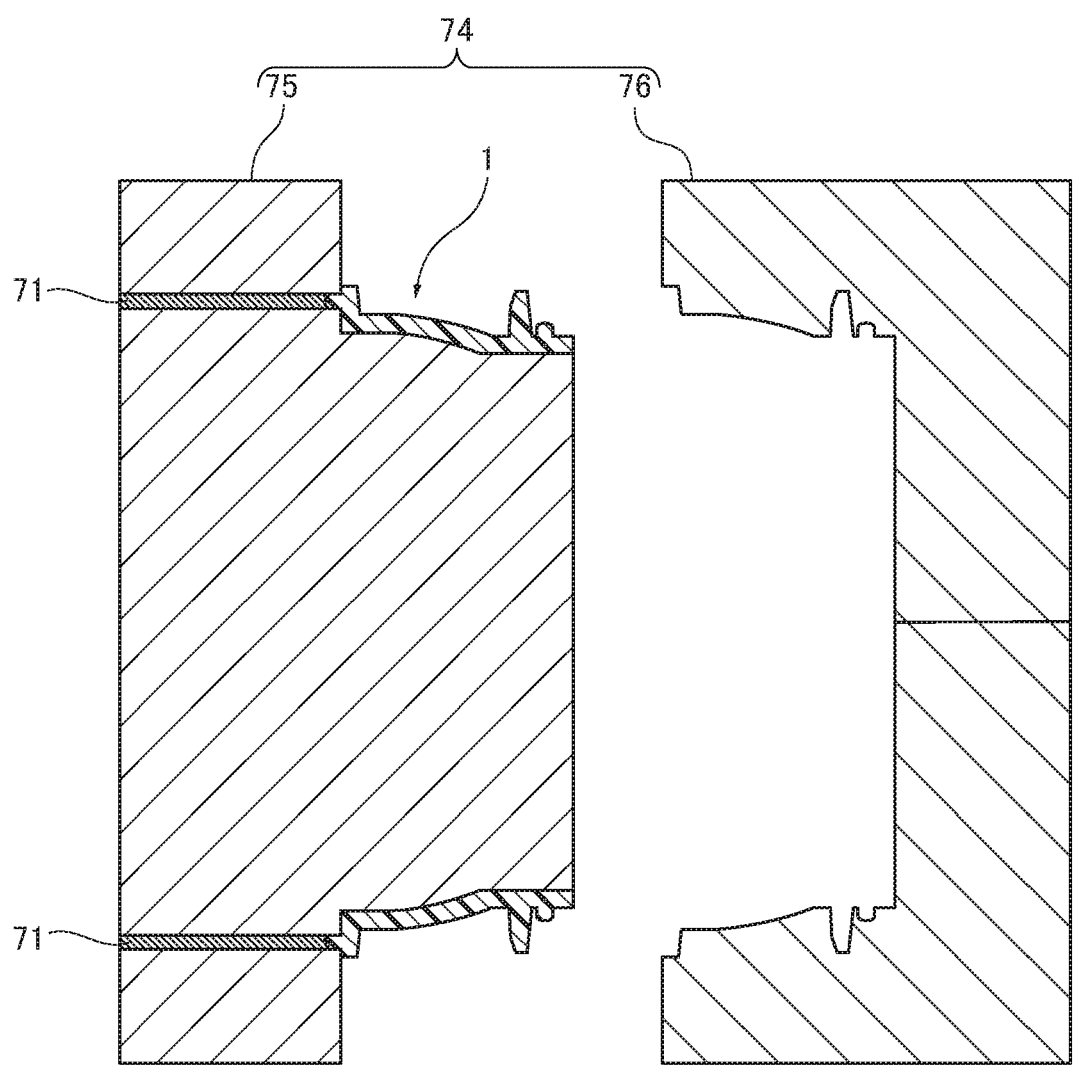
FIG. 11 is an explanatory view of the mold device before demolding the housing.

Here, the housing 8 is made of resin and formed by injection molding using a mold device 74 as shown in FIGS. 10 and 11. The mold device 74 includes a male die 75 and a female die 76 which together form a molding space having a shape of the housing 8. Further, the mold device 74 includes a plurality of ejector pins 71 (in the male die 75) for demolding the housing 8 from the male die 75 after disengaging the male die 75 and the female die 76 with the molded housing 8 left in the male die 75. Note that the mold device 74 is simplified for an illustrative purpose and it is more complicated than the one described above. Accordingly, the configuration of the mold device 74 is not limited to the above. For example, the split position of the male die 75 and the female die 76 may be changed and sliding type device may be used as the mold device 74.

In this embodiment, as shown in FIG. 7, the receiving surfaces 72 which receive the ejector pins 71 are separately arranged in the circumferential direction 24 of the air flow-out end 9 of the housing 8. In this case, first, it is conceivable to provide the receiving surface 73 in portions of the end 9 where the ribs 45 are not provided. However, it is necessary to provide the receiving surfaces 72 in portions where the ribs 45 are provided when the receiving surfaces 73 cannot be provided in the portions where the ribs 45 are not provided or when the receiving surfaces 73 are not enough only with the receiving surfaces 73 provided in the portions where the ribs 45 are not provided, for example.

Figure 12:
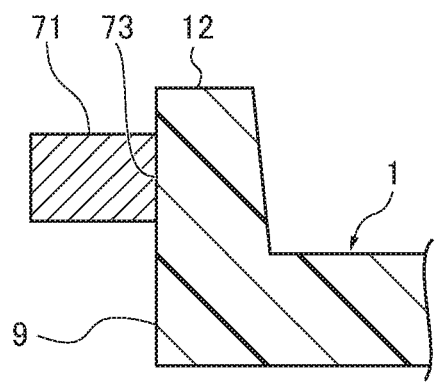
FIG. 12 is an explanatory view illustrating a receiving surface of an ejector pin (a partially enlarged view illustrating a case where the receiving surface is provided on a plane surface).

In the case where the receiving surfaces 73 are provided in the portions of the air flow-out end 9 of the housing 8 with no ribs 45, it is usual to flatten the tip of the ejector pin 71 and to provide the flat receiving surfaces 73 in the end 9, each of which has the substantially same size as the tip of the ejector pin 71 as shown in FIG. 12.

Figure 13:
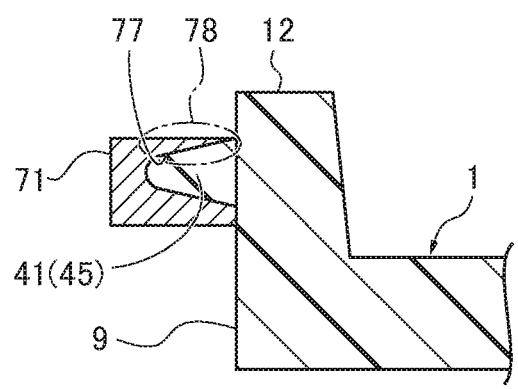
FIG. 13 is an explanatory view illustrating the receiving surface of the ejector pin (a partially enlarged view illustrating a case where the receiving surface is provided in a rib).

On the other hand, in the case where the receiving surface 72 are provided in the portions of the air flow-out end 9 of the housing 8 with the ribs 45, the tip of the ejector pin 71 is first formed to have a concave shape (a recess 77) coincident with the tip of the ribs 45 as shown in FIG. 13.

Figure 14:
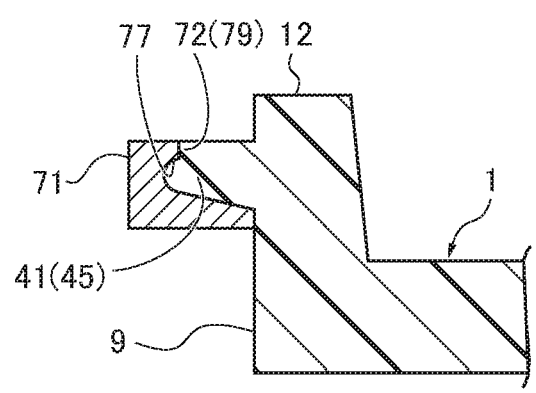
FIG. 14 is an explanatory view illustrating the receiving surface of the ejector pin according to the embodiment (which is improved from the case shown in FIG. 13).

Further, as shown in FIG. 14, a portion to become a sharp edge (a sharp edge portion 78, see FIG. 13) in the tip of the ejector pin 71 is cut off and the flat receiving surface 72 having the substantially same size as the cut portion is provided on the end surface of the rib 45. The receiving surface 72 is formed by providing a partial step portion 79 in the end surface of the rib 45. In this embodiment, the receiving surface 72 of the rib 45 is provided in the outer circumferential side off (away from) the tip of the rib 45.

Hereinafter, operations of this embodiment will be described. By operating the air-conditioning system mounted in the vehicle to select an air supplying mode of the air 7 to the vehicle cabin, the air-conditioned air 7 from the air-conditioning system is supplied from the air vent portion 1 to the vehicle cabin through the air-conditioning duct. In the air vent portion 1, the rotation of the louver slats 15 about the rotational center shafts 18 can open or close the opening 3, adjust the opening degree of the opening 3, and change the flow direction of the air 7 about the rotational center shafts. Further, the rotation of the housing 8 in the circumferential direction 24 can adjust the directions of the louver slats 15 (flow direction of the air 7) in the circumferential direction 24.

According to the embodiment, following effect can be obtained.

The air vent structure includes at least the housing 8, and the annular finisher 11 disposed in the air flow-out end 9 of the housing 8. The air-conditioned air 7 flows (into the vehicle cabin) through the inside of the tubular housing 8 (the air passage 14) and the inside of the annular finisher 11.

The relatively small clearance 27 is formed between the air flow-out end 9 of the housing 8 and the finisher 11 because of the structures (specifically because it is required to rotate the housing 8 in the circumferential direction 24 relative to the grill body 23). When the air-conditioned air 7 flows into the clearance 27, the air 7 may generate (high-frequency) wind noise (or edge tones such as whistling noise).

The air 7 is restricted not to flow out from the opening 3 by the louver slats 15 especially when the opening 3 is about to be closed by moving the louver slats 15 or when the opening 3 is completely closed especially as the air 7 is flowing. As a result, the restricted air 7 is intensively directed to the clearance 27 (the flow rate, flow velocity, or flow pressure of the air-conditioned air 7 flowing into the clearance 27 increases), which more likely generates the wind noise.

The wind noise has to be prevented since the generation of the wind noise is a defect of a product. Accordingly, the air restrictors 41 are provided around the clearance 27. The air restrictors 41 provided around the clearance 27 prevent the air 7 from flowing into the clearance 27 so that the (high-frequency) wind noise cannot be generated.

The air restricting ribs 45 is (integrally) formed in the air flow-out end 9 of the housing 8 and extends therefrom. The air restricting ribs 45 restricts the inflow of the air 7 into the clearance 27 so that the (high-frequency) wind noise can be prevented.

By providing the air restricting ribs 45 in the air flow-out end 9 of the housing 8, the air restricting ribs 45 are covered by the annular finisher 11. Therefore, it is possible to provide (the air restricting ribs 45 as) the air restrictors 41 which cannot be seen from the outside.

The air restricting ribs 45 are provide to extend into the space 51 defined in the portion of the finisher 11 facing the housing 8 (for the design reason). Accordingly, the air restricting ribs 45 can be effectively provided in the air flow-out end 9 of the housing 8 by means of the shape of the finisher 11. As a result, the effect to restrict the inflow of the air 7 into the clearance 27 can also be obtained.

By providing the air restricting ribs 45 to extend into the space 51, the air restricting ribs 45 can be formed larger or longer compared to the case where ribs are provided in the narrowest portion (especially in the vicinity of the inlet) of the clearance 27 between the air flow-out end 9 of the housing 8 and the finisher 11. Therefore, the air restricting ribs 45 can be easily formed.

The air restricting ribs 45 is provided to extend along at least a portion of the air flow-out end 9 of the housing 8 in the circumferential direction 24. Accordingly, it is possible to partially provide the air restricting ribs 45 only in an area where the air 7 to the clearance 27 can be effectively restricted by the ribs 45. In this embodiment, it is possible to provide the ribs 45 in the portions around the side edges 22 of the louver slats 15.

The receiving surfaces 72 (pin receiving surface) are provided around the tip of the air restricting ribs 45 relative to the ejector pin 71. The housing 8 made of resin is formed by injection molding using the mold device 74 and demolded from the mold device 74 as a molded product in the final step of the injection molding. The housing 8 is demolded from the mold device 74 by pressing the receiving surfaces 72 in the housing 8 with the ejector pin 71 provided in the mold device 74 (in the axial direction of the housing 8).

By providing the receiving surfaces 72 around the tip of the air restricting ribs 45, it is possible to form the receiving surfaces 72 together with the ribs 45. Accordingly, the receiving surfaces 72 can be easily formed, the receiving surfaces 72 can be set without greatly influencing on the design of the housing 8, and the degree of freedom for the design of the mold device 74 can also be improved.

In particular, each of the receiving surfaces 72 is provided around the tip of the ribs 45 at a location in the outer circumferential side off the tip of the rib 45 so as to prevent the sharp edge portion 78 from being formed in the tip of the ejector pin 71. Accordingly, it is possible to make the tip of the ejector pin 71 easy to secure the strength (or to eliminate insufficient strength). In addition, the receiving surface 72 is provided off the tip of the ribs 45 so that a recess or the like cannot be formed on the tip of the ribs 45 by the receiving surfaces 72. Therefore, it is possible to prevent the defect that deteriorates the restricting effect of the air 7 caused by the air 7 escaping from a recess which would be formed by the receiving surface 72.

Hereinafter, other embodiments will be described.

Figure 15:
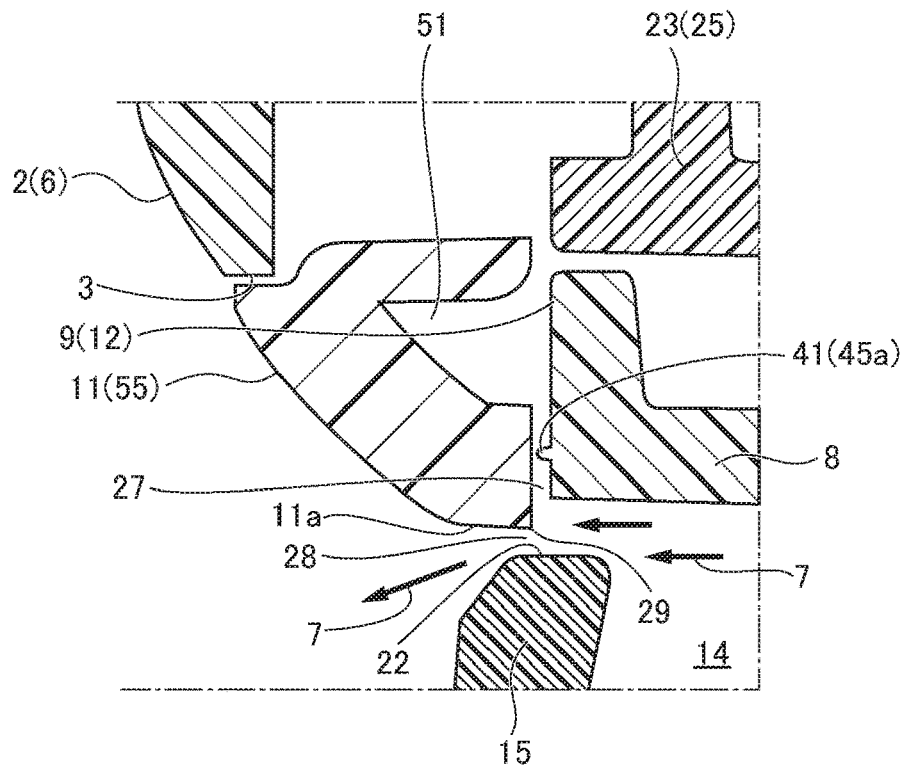
FIG. 15 is a partially enlarged cross sectional view, which is similar to FIG. 5, according to the Second Embodiment.

As shown in FIG. 15 (Second Embodiment), air restricting ribs 45a as the air restrictors 41 may be provided within the clearance 27 between the air flow-out end 9 of the housing 8 and the finisher 11 and in the vicinity of the inlet of the clearance 27, for example.

Figure 16:
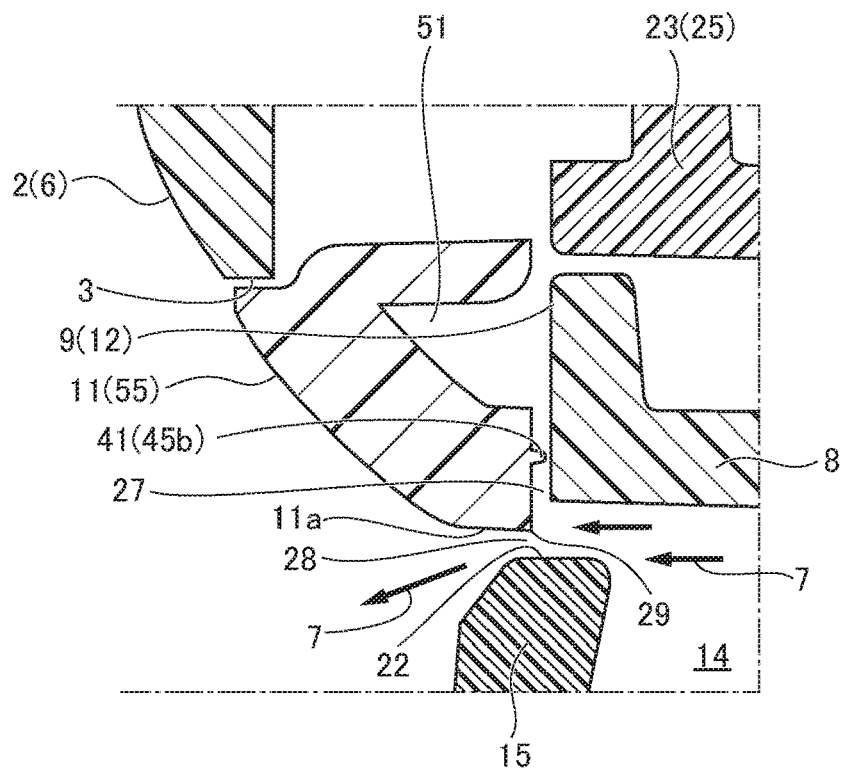
FIG. 16 is a partially enlarged cross sectional view, which is similar to FIG. 5, according to the Third Embodiment.
Figure 17:
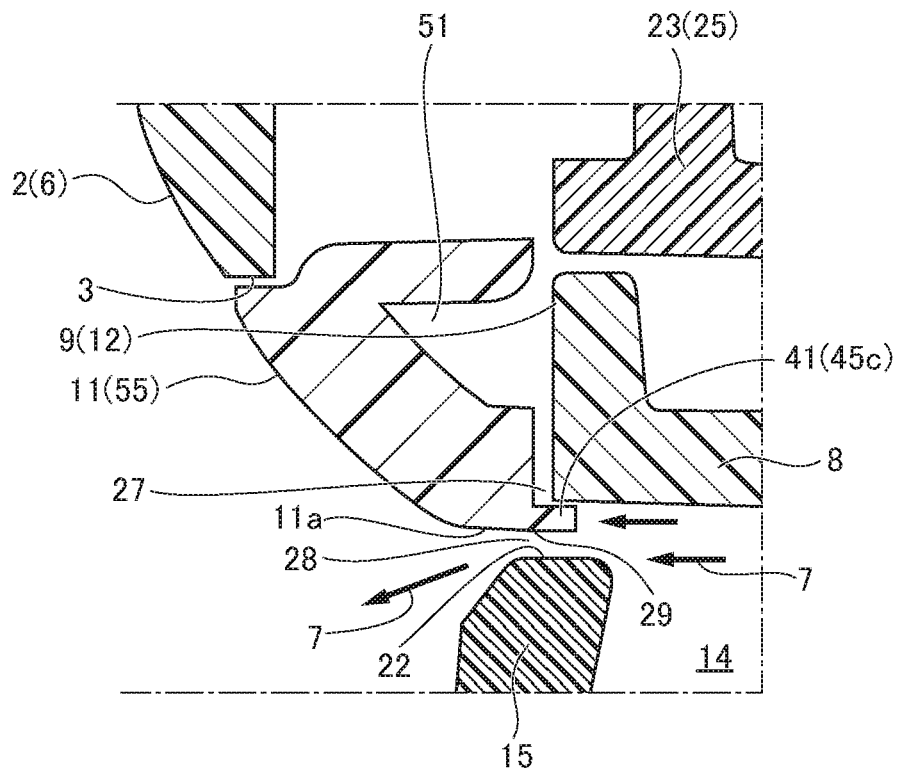
FIG. 17 is a partially enlarged cross sectional view, which is similar to FIG. 5, according to the Fourth Third Embodiment.
Figure 18:
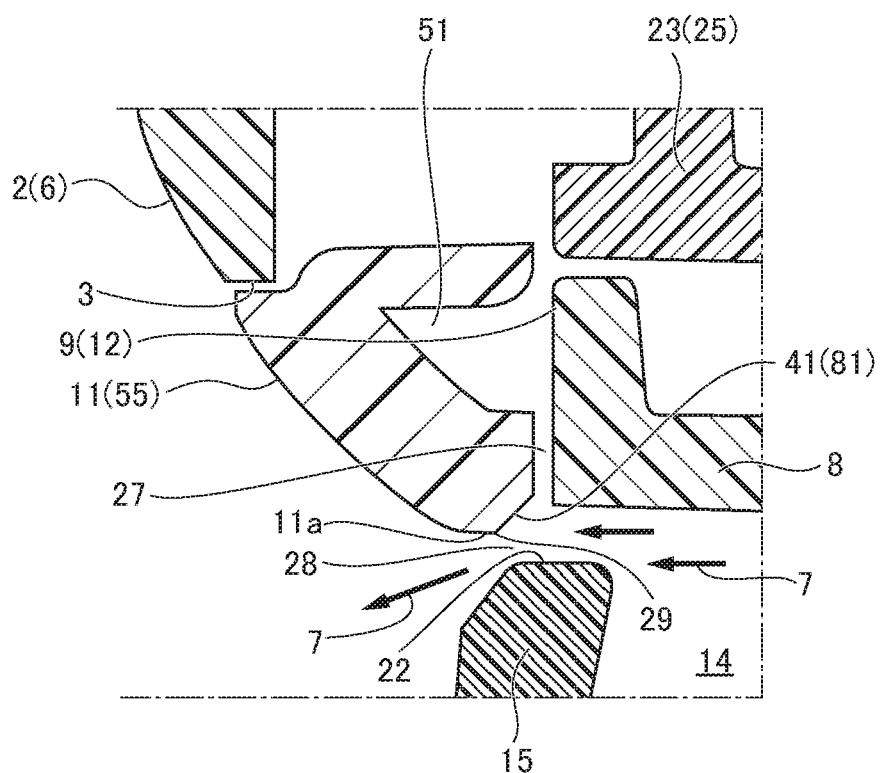
FIG. 18 is a partially enlarged cross sectional view, which is similar to FIG. 5, according to the Fifth Embodiment.

Alternatively, as shown in FIG. 16 to FIG. 18 (Third Embodiment to Fifth Embodiment), the air restrictors 41 may be provided in a portion of the finisher 11 facing the housing 8.

For example, in FIG. 16 (Third Embodiment), air restricting ribs 45b as the air restrictors 41 are integrally provided in the finisher 11 within the clearance 27 in the vicinity of the inlet of the clearance 27. Note that in the case where the air restricting ribs 45a, 45b as the air restrictors 41 are provided within the clearance 27 in the vicinity of the inlet as shown in FIGS. 15, 16, it is necessary to form the air restricting ribs 45a, 45b with higher accuracy than the ribs 45 in the First Embodiment so as not to contact the opposing member (such as the finisher 11 or the housing 8).

In FIG. 17 (Fourth Embodiment), air restricting ribs 45c as the air restrictors 41 are provided in the finisher 11 at a position radially inward of the inlet of the clearance 27 (outside of the clearance 27) to cover the inlet without contacting the housing 8. According to this embodiment, the restricting effect relative to the air 7 can also be obtained since the complicated shape of the inlet of the clearance 27 increases its resistance.

In FIG. 18 (Fifth Embodiment), an air directing portion 81 is provided as the air restrictors 41, which guides the air 7 to the clearance 28 between the finisher 11 and the louver slats 15. The air directing portion 81 is formed by obliquely cutting off the protruding portion 29 of the finisher 11. According to the embodiment, the flow of the air 7 into the clearance 27 can also be restricted.

With regard to the other embodiment shown in FIG. 15 to FIG. 18, the same effect as the First Embodiment can also be obtained.

REFERENCE SIGNS LIST

7 Air, 8 Housing, 11 Finisher, 24 Circumferential Direction, 41 Air Restrictor, 45 Rib, 51 Spacing, 71 Ejector Pin, 72 Receiving Surface

What is claimed is:

1. An air vent structure comprising:
a tubular housing through which an air-conditioned air flows, wherein the housing comprises an air passage defined by an inner circumferential surface thereof and a louver slat therewithin;
an annular finisher that is disposed adjacent to and spaced from an air flow-out side end surface of the housing, wherein an inner diameter of the finisher is smaller than an inner diameter of the housing so that a cross-section of the air vent structure defines a reverse-stepwise shaped portion formed by an inner circumferential surface of the finisher and the inner circumferential surface of the housing;
a grill body that is configured to rotatably receive the housing, wherein the finisher is fixed to the grill body;
a clearance that is configured to maintain the housing and the finisher in a no-contact state, wherein the clearance is defined between the air flow-out side end surface of the housing and the finisher and is in communication with the air passage of the housing between the housing and the finisher;
a space that is provided along a rear surface of the finisher and is in communication with the clearance, wherein the space is entirely located radially outward of the reverse-stepwise shaped portion and the inner circumferential surface of the housing, and the space is in communication with the air passage of the housing via the clearance; and
an air restricting rib extending from the air flow-out side end surface of the housing into the space, wherein the air restricting rib does not contact the finisher, and
wherein the housing is rotatably disposed relative to the finisher in a circumferential direction.

2. The air vent structure according to claim 1, wherein the air restricting rib extends along at least a part of the air flow-out side end surface of the housing in a circumferential direction.

3. The air vent structure according to claim 1, wherein the louver slat is rotatably disposed within the housing to open and close the air passage.

4. The air vent structure according to claim 3, further comprising a second clearance defined between the inner circumferential surface of the finisher and a side edge of the louver slat when the louver slat closes the air passage, and
wherein an inlet of the clearance is equal to or smaller than the second clearance.

5. The air vent structure according to claim 1,
wherein the housing comprises an installation surface for a holder that is configured to hold the louver slat to the housing, the holder comprising a protrusion that inwardly protrudes beyond the inner diameter of the finisher, and
wherein the air restricting rib is disposed in a portion of the housing where the protrusion is not located, and wherein the portion is along a side edge of the louver slat when the louver slat closes the air passage.

6. The air vent structure according to claim 1, wherein the clearance is located between the space and the reverse-stepwise shaped portion.

7. The air vent structure according to claim 1, wherein the space is formed by an indentation in the rear surface of the finisher.

\* \* \* \* \*